US006289810B1

(12) United States Patent
Shih

(10) Patent No.: US 6,289,810 B1
(45) Date of Patent: Sep. 18, 2001

(54) PHOTOENGRAVING MACHINE FOR STAMPING FACE

(76) Inventor: Shiny Shih, No. 31, Lane 349, Chungcheng S. Rd., Yungkang City, Tainan Hsien (TW)

( * ) Notice: Subject to any disclaimer, the term of this patent is extended or adjusted under 35 U.S.C. 154(b) by 0 days.

(21) Appl. No.: 09/464,173

(22) Filed: Dec. 16, 1999

(51) Int. Cl.[7] .................................................... G03B 27/02

(52) U.S. Cl. .......................... 101/401.1; 355/99; 355/113

(58) Field of Search ................................ 101/128.4, 327, 101/401.1, 485, 486; 355/85, 99, 113, 130

(56) References Cited

U.S. PATENT DOCUMENTS 3,067,666 * 12/1962 Coffman ............................... 355/113
3,627,417 * 12/1971 Watson et al. ....................... 355/113
4,343,549 * 8/1982 Nanjo .................................. 355/113
4,493,541 * 1/1985 Goetschi ............................. 355/113
4,541,714 * 9/1985 Miyamoto ............................. 355/99
5,745,222 * 4/1998 Kameda et al. ....................... 355/99
5,873,308 * 2/1999 Taira ................................... 101/327

* cited by examiner

*Primary Examiner*—Stephen R. Funk
(74) *Attorney, Agent, or Firm*—Pearne & Gordon LLP

(57) ABSTRACT

A photoengraving machine comprised of a cabinet with a flash light mounted in an upper lever thereof facing down towards a fixture seat. The fixture seat is secured on a slide-in chassis in the cabinet. The fixture seat comprises an adjustable clamping assembly to securely hold different sizes of stamps. Consequently, a prefabricated stamp with a stamping face made of a black EVA sheet can be securely held on the fixture seat to be photoengraved in the cabinet under a flash lighting. Thus, the process of photoengraving for stamping face is simplified and the quality of the photoengraving is ensured by the photoengraving machine.

8 Claims, 8 Drawing Sheets

PHOTOENGRAVING MACHINE FOR STAMPING FACE

BACKGROUND OF THE INVENTION

1. Field of the Invention

The present invention relates to an improved photoengraving machine used to engrave stamping faces using photoengraving technology with high efficiency, low cost and low pollution.

2. Description of Related Art

Photoengraving is an advanced method of engraving stamping faces because of its high efficiency. As shown in FIGS. 6 to 8, a flash light (51) is provided in a lower portion of a conventional photoengraving machine (50). A positive film (41) with text or images should be aligned with an opening (421) in a positioning frame (42) and glued onto the positioning frame (42). The opening (421) of the positioning frame (42) is formed to conform to the stamping face of a stamp. The positive film (41) glued on the positioning frame (42) is placed first on a glass plate (40) provided in the photoengraving machine (50) above the flash light (51). Then a carbon film (43) is placed on the positive film (41), and a thin ethylene-vinyl acetate EVA, sheet (44) the size of the opening (421) in the positioning frame (42) is placed on the carbon film (43) for test engraving. A pressing apparatus (46) is placed on the thin EVA sheet (44), and a top cover (52) of the photoengraving machine (50) is closed to be ready for a flash. The engraved thin EVA sheet (44) should be examined, and an adjustment of the positive film (41) may be made to ensure that the text and images are aligned with the opening (421) of the positioning frame (42).

After the test with the thin EVA sheet, a thick EVA sheet (45) is mounted with a new carbon film (43) between the positive film (41) and the thick EVA sheet (45). Then the pressing apparatus (46) is placed on the thick EVA sheet (45), and the top cover (52) is closed to be ready for a formal photoengraving.

The engraved thick EVA sheet (45) should be mounted on a stamp as a stamping face and bonded to the stamp by a sheet of polyethylene (PE) on an electric heater.

The following are a number of shortcomings that exist with the conventional photoengraving machine.

1. The process of photoengraving a stamping face is complex. As the precision of aligning the positive film with the stamping face is difficult to control, the thick EVA sheet used in the formal engraving should have a margin left around the engraved area. The margin is cut after photoengraving to ensure the alignment of the text and images on the stamping face.

2. The quality of the photoengraving is dependent on the experience of skilled workers.

3. The photoengraved stamping face should be bonded on a stamp, and the bonded surfaces should be tested before filling the stamp with ink to ensure that ink will not leak around the edges of the stamping face.

Therefore, it is an objective of the invention to provide an improved photoengraving machine for stamping face to mitigate and/or obviate the aforementioned problems.

SUMMARY OF THE INVENTION

The main object of the present invention is to provide a photoengraving machine to fabricate stamping faces. The photoengraving machine comprises a lightproof cabinet with a flash light in an upper lever of the photoengraving machine and a fixture seat secured on a slide-in chassis in the cabinet. A prefabricated stamp with a stamping face made of a black EVA sheet is held by the fixture seat to be photoengraved under the flashing light. Therefore, the process of photoengraving a stamping face is simplified and the quality of the photoengraving of the stamping face is ensured by the photoengraving machine in accordance with the present invention.

Other objects, advantages and novel features of the invention will become more apparent from the following detailed description when taken in conjunction with the accompanying drawings.

DETAILED DESCRIPTION OF THE PREFERRED EMBODIMENT

Figure 1:
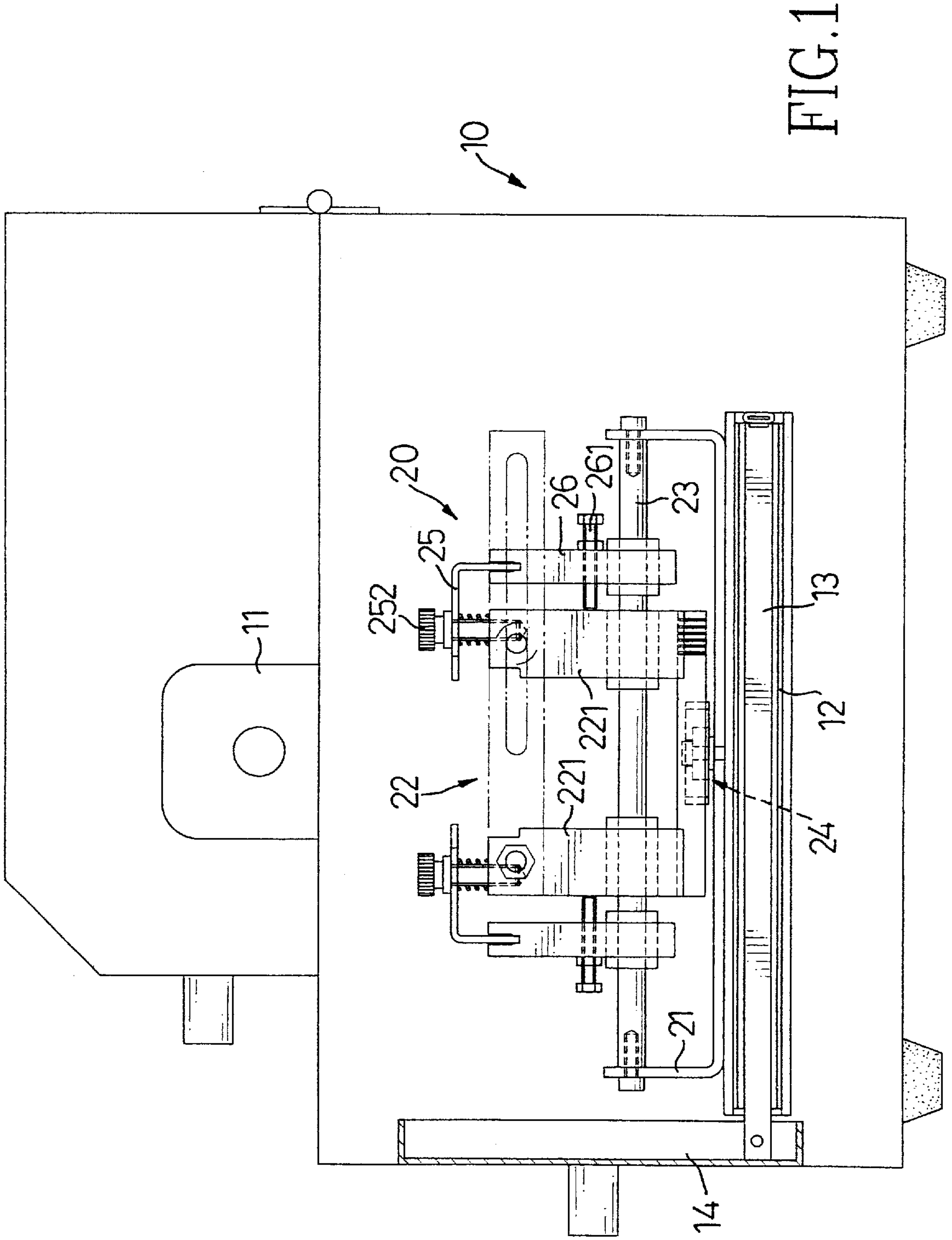
FIG. 1 is a side view of a photoengraving machine for stamping face in accordance with the invention.

As shown in FIG. 1, a photoengraving machine in accordance with the present invention is used to engrave a stamping face by a simplified photoengraving process. The photoengraving machine comprises a cabinet (10) with a flash light (11) mounted in an upper lever of the photoengraving machine. The flash light (11) faces down towards a fixture seat (20) that is securely mounted on a slide-in chassis (12) in the cabinet (10). The cabinet (10) is rectangular with two pairs of opposed sidewalls and a top and a bottom. The slide-in chassis (12) is slidable along a pair of rails, and a cover plate (14) covers an opening in the cabinet (10) that provides access to the chassis (12). The rails (13) are respectively secured on opposite sidewalls of the cabinet (10). The cover plate (14) provided at the outside of the slide-in chassis (12) will close over a side opening in the cabinet (10) when the slide-in chassis (12) is pushed into the cabinet (10), thereby the inner space of the cabinet (10) is kept lightproof.

Figure 2:
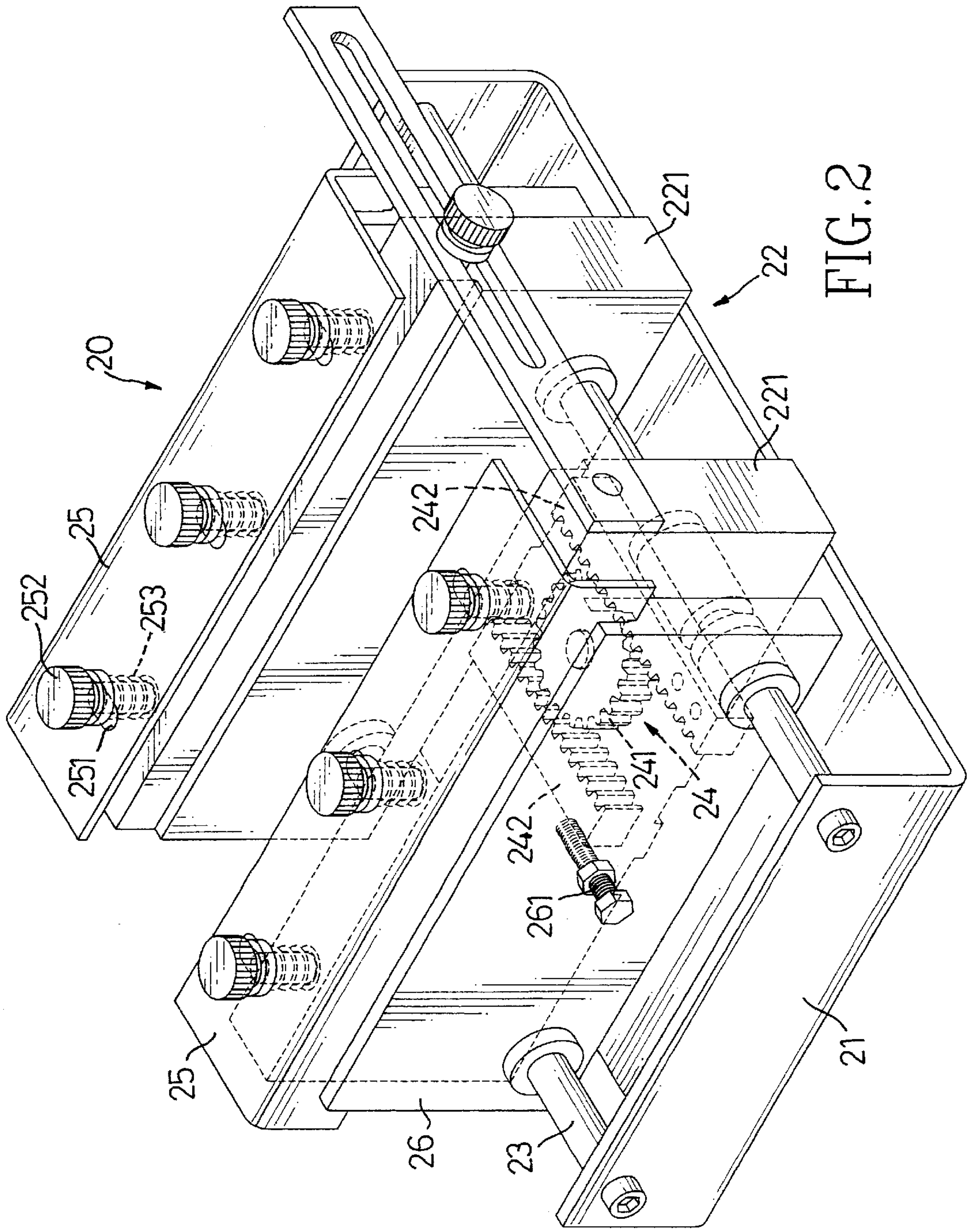
FIG. 2 is a perspective view of a fixture seat of the photoengraving machine for stamping face in FIG. 1.
Figure 3:
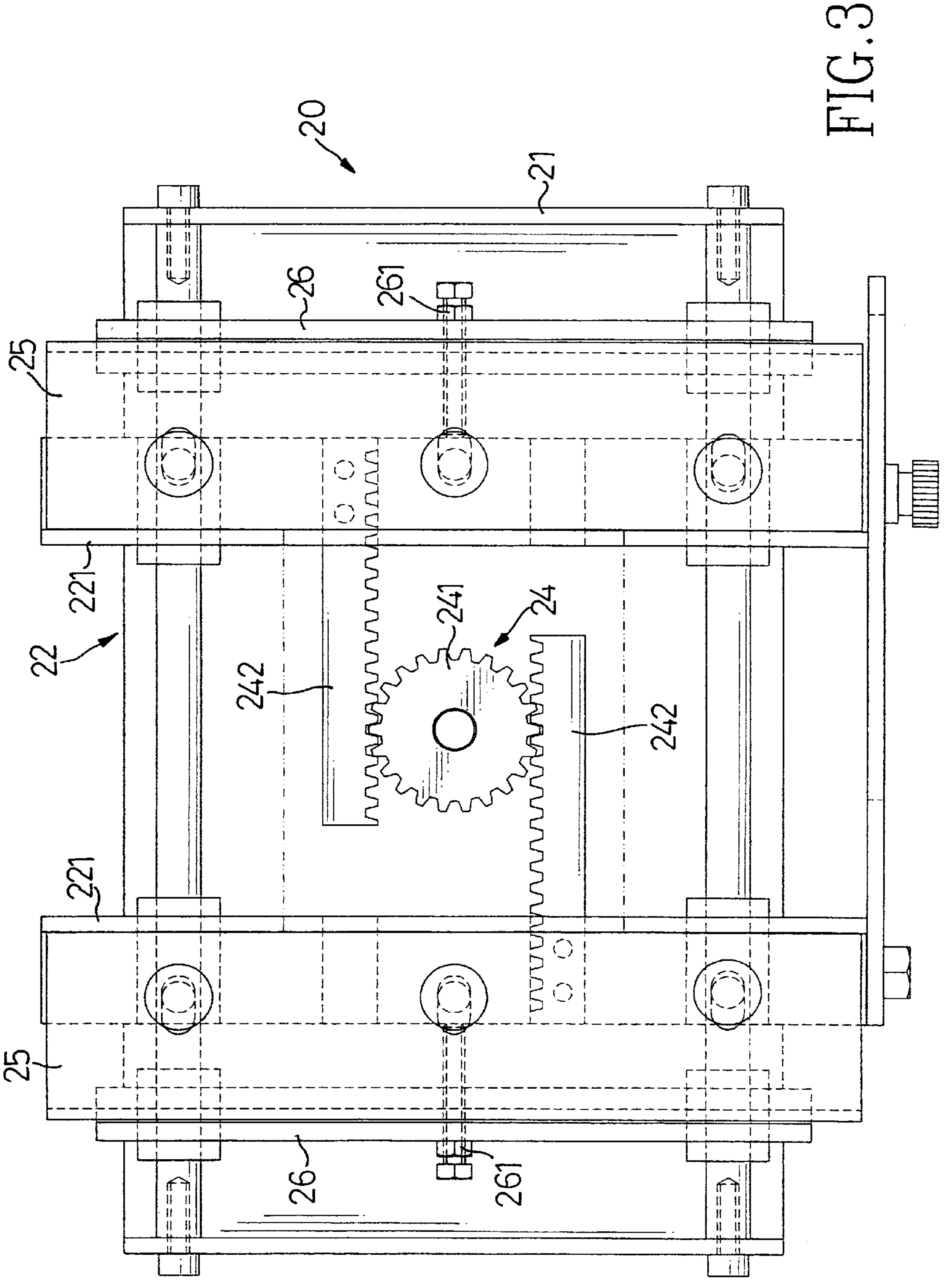
FIG. 3 is a top view of the fixture seat of the photoengraving machine for stamping face in FIG. 1.

As best seen in FIGS. 2 and 3, the fixture seat (20) is principally composed of a U-shaped base (21) with a bottom securely mounted on the slide-in chassis (12) and a clamping assembly (22), which is operably provided on the base (21). The clamping assembly (22) comprises two clamping blocks (221) with two side faces movable along two horizontal shafts (23), a driving mechanism (24) provided between the two clamping blocks (221) and two L-shaped clamping plates (25) respectively secured with two support stands (26).

Opposite side faces of upper ends of the clamping blocks (221) respectively form two steps to clamp the stamps. The horizontal shafts (23) are parallel to each other and extend through the clamping blocks (221) with opposite ends of each horizontal shaft (23) secured in opposite sidewalls of the U-shaped base (21).

The driving mechanism (24) includes a pinion gear (241) and two racks (242). The pinion gear (241) is rotatably mounted at the center of the base (21). The racks (242) are respectively engaged to diametrically opposite sides of the pinion gear (241) and respectively have one end secured to opposite side faces of the clamping blocks (221). Therefore, the clamping blocks (221) are movable towards or away from the center of the fixture seat (20) in unison. The center of the base (21) of the fixture seat (20) is aligned with the center of the flash light (11) when the chassis (12) is fully pushed into the cabinet (10). Consequently, a stamp clamped in the fixture seat (20) will always be positioned under the flash light (11) when the chassis (12) is pushed into the cabinet (10).

The support stands (26) are respectively and movably mounted on the shafts (23) at outer sides of the clamping blocks (221). Each of the L-shaped clamping plates (25) has a vertical extension portion secured with one of the support stands (26) and a horizontal extension portion extended over a top end of one of the clamping blocks (221). At least one slot (251) is defined in each clamping plate (25) with an adjusting screw (252) extending through the slot (25) and screwed into a threaded hole defined in the top of the clamping block (221) to make the position of the clamping plate (25) adjustable. A spring (253) is provided around the adjusting screw (252) between the clamping plate (25) and the clamping block (221). The space between each support stand (26) and the adjacent clamping block (221) is also adjustable by a bolt (261) screwed into the support stand (26).

Figure 4:
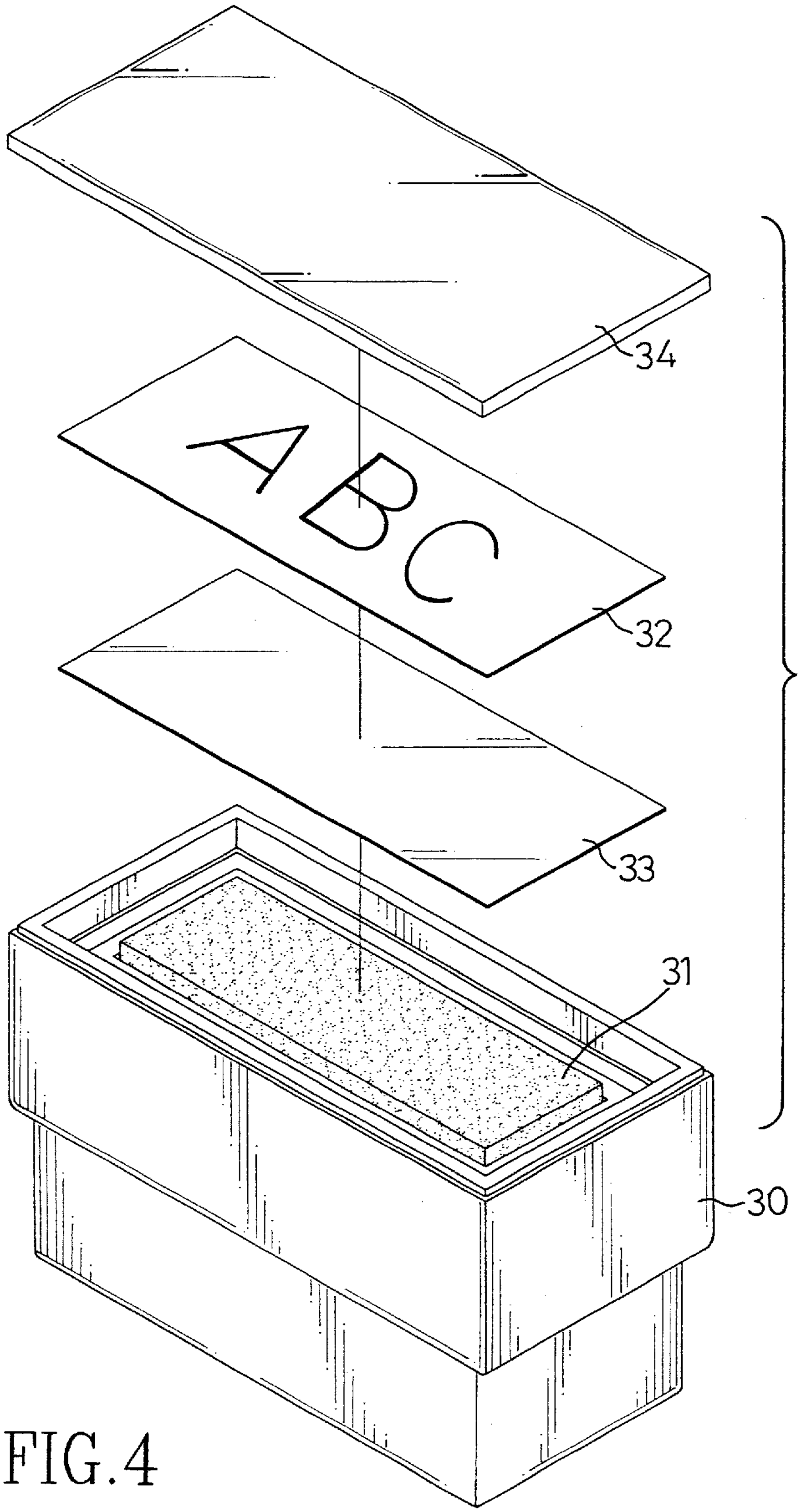
FIG. 4 is an exploded perspective view of a stamp prepared for photoengraving in the photoengraving machine in FIG. 1.

Before photoengraving, as shown in FIG. 4, a prefabricated stamp (30) with a stamping face made of a piece of black EVA sheet (31) should be covered with a polyethylene film. Then a positive film (32) having text or images is placed on the polyethylene film (33) with a piece of glass (34) covering the positive film (32), the polyurethane film and the black EVA sheet (31).

Figure 5:
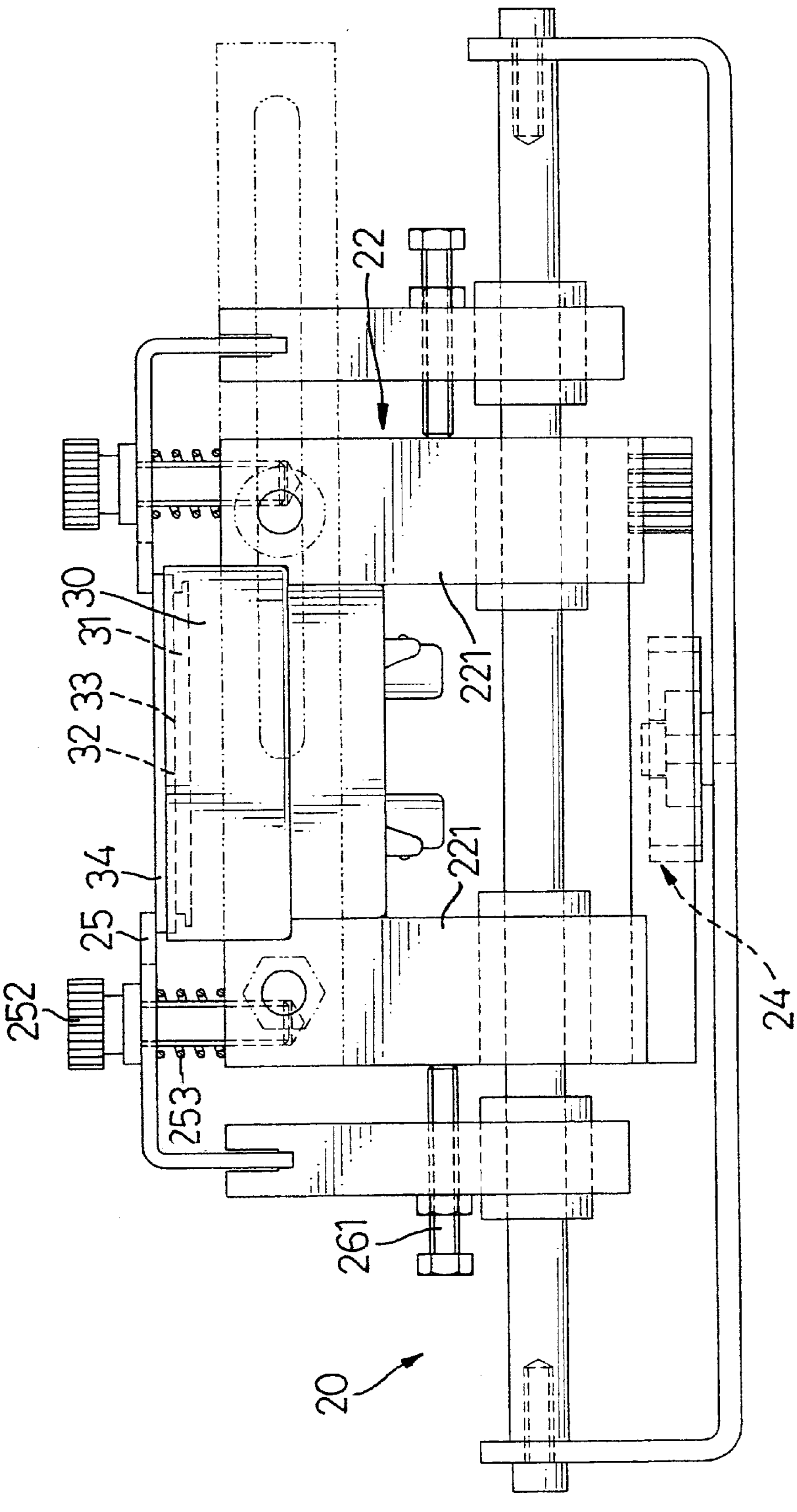
FIG. 5 is a side view of the fixture seat of the photoengraving machine in FIG. 1 with a stamp mounted in the fixture seat.
Figure 6:
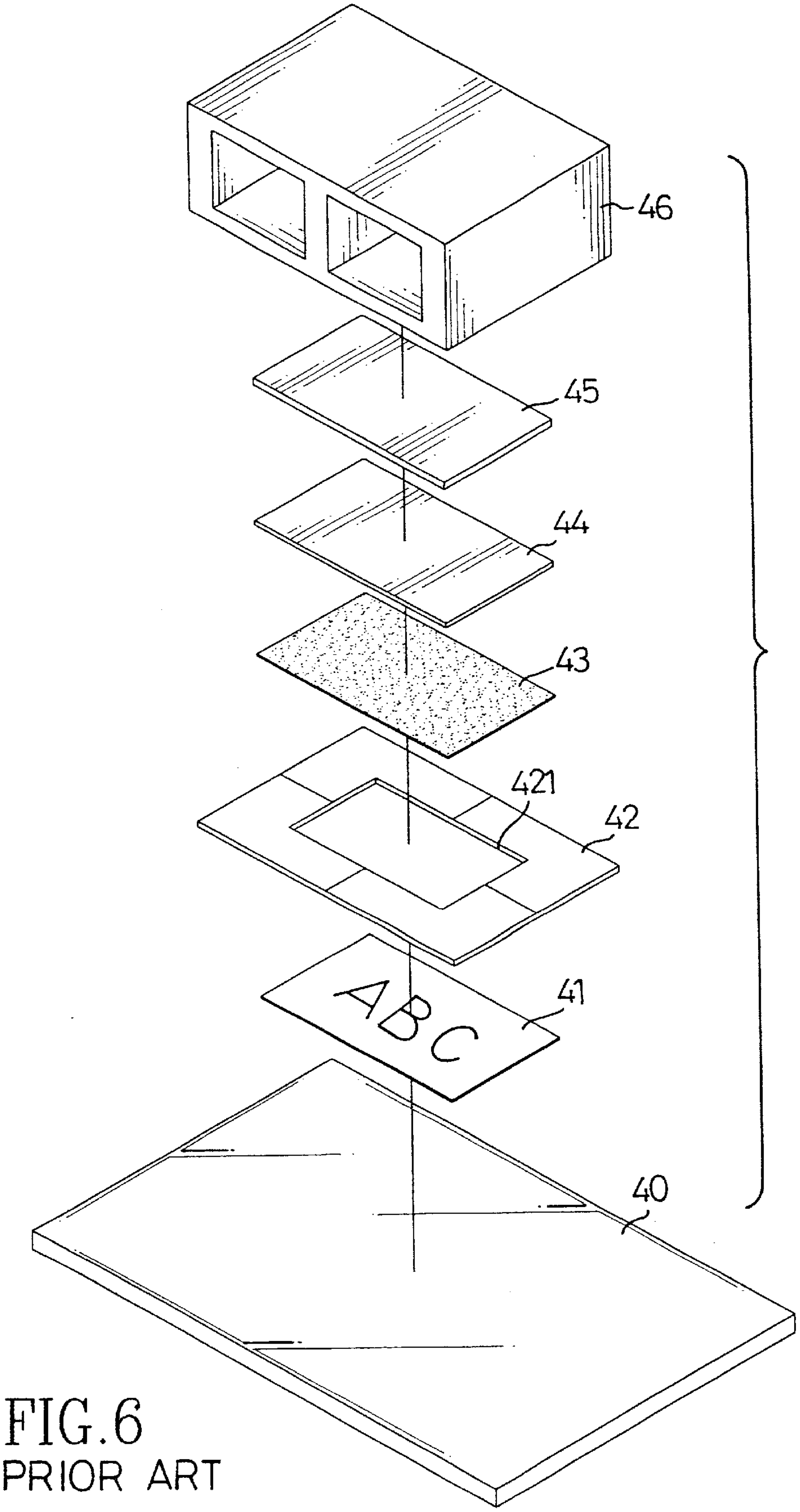
FIG.6 PRIOR ART
FIG. 6 is an exploded perspective view of the elements in a conventional photoengraving technique in a conventional photoengraving.
Figure 7:
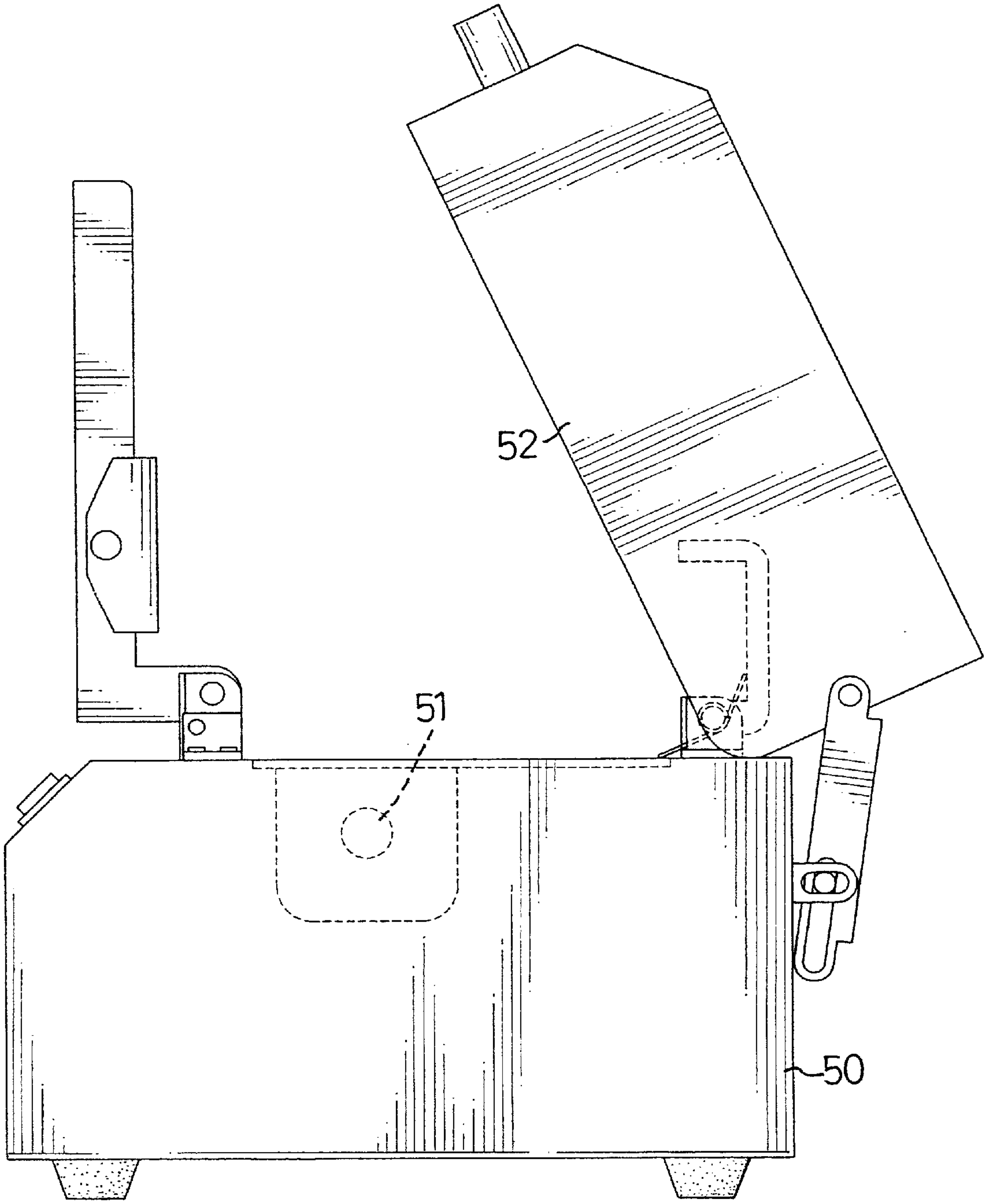
FIG.7 PRIOR ART
FIG. 7 is a side view of a conventional photoengraving machine in accordance with the prior art.
Figure 8:
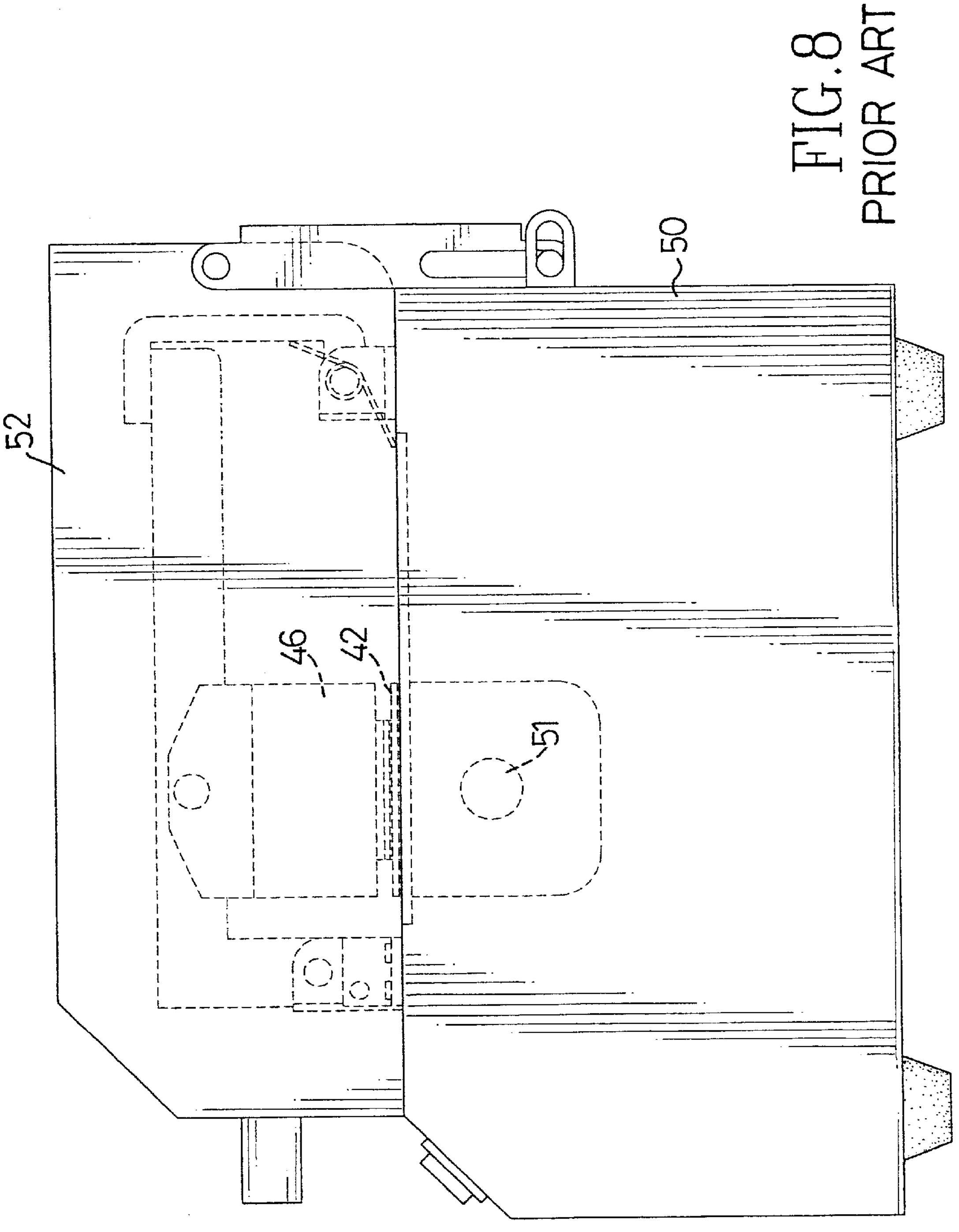
FIG. 8 PRIOR ART
FIG. 8 is an operational side view of the conventional photoengraving machine in FIG. 7.

As best seen in FIG. 5, the stamp (30) prepared for photoengraving is mounted in the clamping seat (22) between the steps in the clamping blocks (221). The clamping plates (25) further fasten the stamp (30) between the clamping plates (25) and the clamping blocks (221).

Because the center of the fixture seat (20) is aligned with the center of the flash light and the clamping blocks (221) move toward or away from the center of the fixture seat (20) in unison, the stamp (30) is positioned directly under the flash light when the slide-in chassis (12) is pushed into the cabinet (10) with the cover plate (14) closed over the side opening in the cabinet (10).

After photoengraving, carbon particles bonded to the black EVA sheet (31) are melted with the EVA sheet, thereby transferring the images of the positive film (31) to the stamping face of the stamp (30).

From the foregoing description, it is noted that the invention has the following advantages:

1. The photoengraving process is simplified, since the stamp is prefabricated with a stamping face made of black EVA sheet by manufacturers, the cost of the photoengraving is reduced;

2. Precision of the photoengraving on the stamping face is ensured by the photoengraving method in accordance with the present invention;

3. Ink can be pre-filled by the manufacturer of the stamp, so as to avoid ink contamination during the photoengraving.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A photoengraving machine for a stamping face comprising a cabinet with two pairs of sidewalls, a top, and a bottom, and a flash light mounted in an upper lever of the cabinet facing down towards a fixture seat that is securely mounted on a slide-in chassis in the cabinet; wherein an adjustable clamping assembly is operably mounted on the fixture seat to hold stamps in the center of the fixture seat and aligned with the center of the flash light.

2. The photoengraving machine for a stamping face as claimed in claim 1, wherein the slide-in chassis is slidable along rails secured on opposite sidewalls of the cabinet, and a cover plate provided outside the slide-in chassis will close a side opening in the cabinet when the slide-in chassis is pushed into the cabinet, thereby the inner space of the cabinet is lightproof.

3. The photoengraving machine for a stamping face as claimed in claim 1, wherein the fixture seat has a U-shaped base securely mounted on the slide-in chassis, the clamping assembly comprising two clamping blocks movable along two horizontal shafts that are parallel to each other and have opposite ends secured to opposite sidewalls of the U-shaped base, a driving mechanism provided between the two clamping blocks and two L-shaped clamping plates respectively extended over the clamping blocks.

4. The photoengraving machine for a stamping face as claimed in claim 3, wherein the driving mechanism includes a pinion gear rotated on the base and two racks that are respectively engaged with diametrically opposite sides of the pinion gear and respectively secured on opposite side faces of the clamping blocks.

5. The photoengraving machine for a stamping face as claimed in claim 3, wherein two steps are formed at the upper ends of the opposite side faces of each clamping block.

6. The photoengraving machine for a stamping face as claimed in claim 3, wherein the clamping plates are respectively secured to two support stands that are movably mounted on the shafts outside of the clamping blocks; at least one slot is defined in each clamping plate with one adjusting screw extending through the slots and screwed into a corresponding threaded hole defined in the top of the clamping blocks.

7. The photoengraving machine for a stamping face as claimed in claim 6, wherein a spring is provided around the adjusting screw between the clamping plate and the clamping block.

8. The photoengraving machine for a stamping face as claimed in claim 6, wherein a bolt is screwed through the support stand to make the space between the support stand and the clamping block adjustable by screwing the bolt.

* * * * *